US006947986B1

(12) United States Patent
Huang et al.

(10) Patent No.: US 6,947,986 B1
(45) Date of Patent: Sep. 20, 2005

(54) SYSTEM AND METHOD FOR PROVIDING WEB-BASED REMOTE SECURITY APPLICATION CLIENT ADMINISTRATION IN A DISTRIBUTED COMPUTING ENVIRONMENT

(75) Inventors: Ricky Huang, Tigard, OR (US); Victor Kouznetsov, Aloha, OR (US); Martin Fallenstedt, Beaverton, OR (US)

(73) Assignee: Networks Associates Technology, Inc., Santa Clara, CA (US)

( * ) Notice: Subject to any disclaimer, the term of this patent is extended or adjusted under 35 U.S.C. 154(b) by 793 days.

(21) Appl. No.: 09/851,648

(22) Filed: May 8, 2001

(51) Int. Cl.$^{7}$ .............................................. G06F 15/173
(52) U.S. Cl. ...................... 709/225; 709/222; 713/201; 717/172
(58) Field of Search ................................ 709/201–203, 709/216–219, 220–226; 713/201; 717/170–173

(56) References Cited

U.S. PATENT DOCUMENTS

| | | | | |
|---|---|---|---|---|
| 6,035,423 | A * | 3/2000 | Hodges et al. | 714/38 |
| 6,108,420 | A * | 8/2000 | Larose et al. | 708/59 |
| 6,256,668 | B1 * | 7/2001 | Slivka et al. | 709/220 |
| 6,347,398 | B1 * | 2/2002 | Parthasarathy et al. | 717/178 |
| 6,408,336 | B1 * | 6/2002 | Schneider et al. | 709/229 |
| 6,675,382 | B1 * | 1/2004 | Foster | 717/177 |
| 6,742,026 | B1 * | 5/2004 | Kraenzel et al. | 709/222 |
| 2004/0139430 | A1 * | 7/2004 | Eatough et al. | 717/174 |

* cited by examiner

*Primary Examiner*—Glenton B. Burgess
*Assistant Examiner*—Yasin Barqadle
(74) *Attorney, Agent, or Firm*—Zilka-Kotab, PC; Christopher J. Hamaty

(57) ABSTRACT

A system and method for providing Web-based remote security application client administration in a distributed computing environment is described. A self-extracting configuration file is stored. The self-extracting configuration file contains an executable configuration file that is self-extractable on a target client into an administered security application. An executable control is embedded within an active administration Web page. The executable control is triggered upon each request for the active Web page and causes dynamic Web content to be generated therefrom. A Web portal including the active administration Web page is exported to a browser application independent of a specific operating environment. The executable control is interpreted to facilitate copying of the self-extracting configuration file to the target client.

30 Claims, 9 Drawing Sheets

SYSTEM AND METHOD FOR PROVIDING WEB-BASED REMOTE SECURITY APPLICATION CLIENT ADMINISTRATION IN A DISTRIBUTED COMPUTING ENVIRONMENT

FIELD OF THE INVENTION

The present invention relates in general to remote security application client administration and, in particular, to a system and method for providing Web-based remote security application client administration in a distributed computing environment.

BACKGROUND OF THE INVENTION

Corporate information technologies are built on enterprise computing environments. These environments typically consist of localized intranetworks of computer systems and resources internal to the organization and geographically distributed internetworks, including the Internet. The intranetworks make legacy databases and information resources available for controlled access and data exchange. The internetworks enable internal users to access remote data repositories and computational resources and allow outside users to access select internal resources for completing limited transactions or data transfer.

Unfortunately, enterprise computing environments are also susceptible to security compromise. A minority of surreptitious users routinely abuse and violate computer interconnectivity by disrupting information processing, defeating security measures and intruding into private computer resources without authorization. Such "hackers" pose an ongoing concern for security administrators charged with safeguarding data integrity and computer security within an enterprise computing environment.

Current tools for administering security applications are lacking and generally incapable of responding quickly enough to avoid wide-spread computer virus infections. The severity of the problem was graphically illustrated by the recent "Love Bug" and "Anna Kournikova" macro virus attacks in May 2000 and February 2001, respectively. The "Love Bug" virus was extremely devastating, saturating email systems worldwide and causing an estimated tens of millions of dollars worth of damage. These examples illustrating the alarming speed of computer virus infection rates underscore the importance of fielding up-to-date computer security applications to every client operating in an enterprise computing environment. As well, updates and patches must be applied as quickly as possible to maximize anti-computer virus protection.

The fielding and installation of security applications generally fall into three categories. The first category employs the manual installation of security applications, using the physical or electronic transfer of installation, configuration, update and patching files onto target clients, one client at a time. This process is time-consuming and offers little opportunity for efficient concurrent installation. The time required and complexity of administration increases with the number of machines and variations between configurations.

The second category employs "pull" installations. This approach is client-based, whereby each client will initiate the copying of security application files from a centralized server responsive to a periodic schedule or user command. The downloaded files are executed and the new configuration takes effect, generally upon system reboot.

The third category employs a centralized administration console, such as provided by the Systems Management Server, licensed by Microsoft Corporation, Redmond, Wash. The security administrator initiates the installation of security or other types of applications onto individual clients from a centralized server-based console. However, this approach requires a specific server configuration and can only be performed on the proprietary administrator's console.

Therefore, there is a need for an approach to provide rapid and highly concurrent installation, configuration, updating, and patching of remote security and non-security applications operating on individual clients. Preferably, such an approach would be centrally controlled with decentralized operation and include a Web-based interface for a simplified user experience.

SUMMARY OF THE INVENTION

The present invention provides a system and method for remotely administering client applications, and in particular, security client applications. A secure portal is defined by Web pages exported as dynamic content from a Web server. The administrator is credentialed and can select one or more target clients within a domain for administration. The client application is copied to each target client for remote installation and setup. By using the Web-based administration server, the administrator can have centralized control and decentralized operation.

An embodiment of the present invention is a system and a method for providing Web-based remote security application client administration in a distributed computing environment. A self-extracting configuration file is stored. The self-extracting configuration file contains an executable configuration file that is self-extractable on a target client into an administered security application. An executable control is embedded within an active administration Web page. The executable control is triggered upon each request for the active Web page and causes dynamic Web content to be generated therefrom. A Web portal including the active administration Web page is exported to a browser application independent of a specific operating environment. The executable control is interpreted to facilitate copying of the self-extracting configuration file to the target client.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
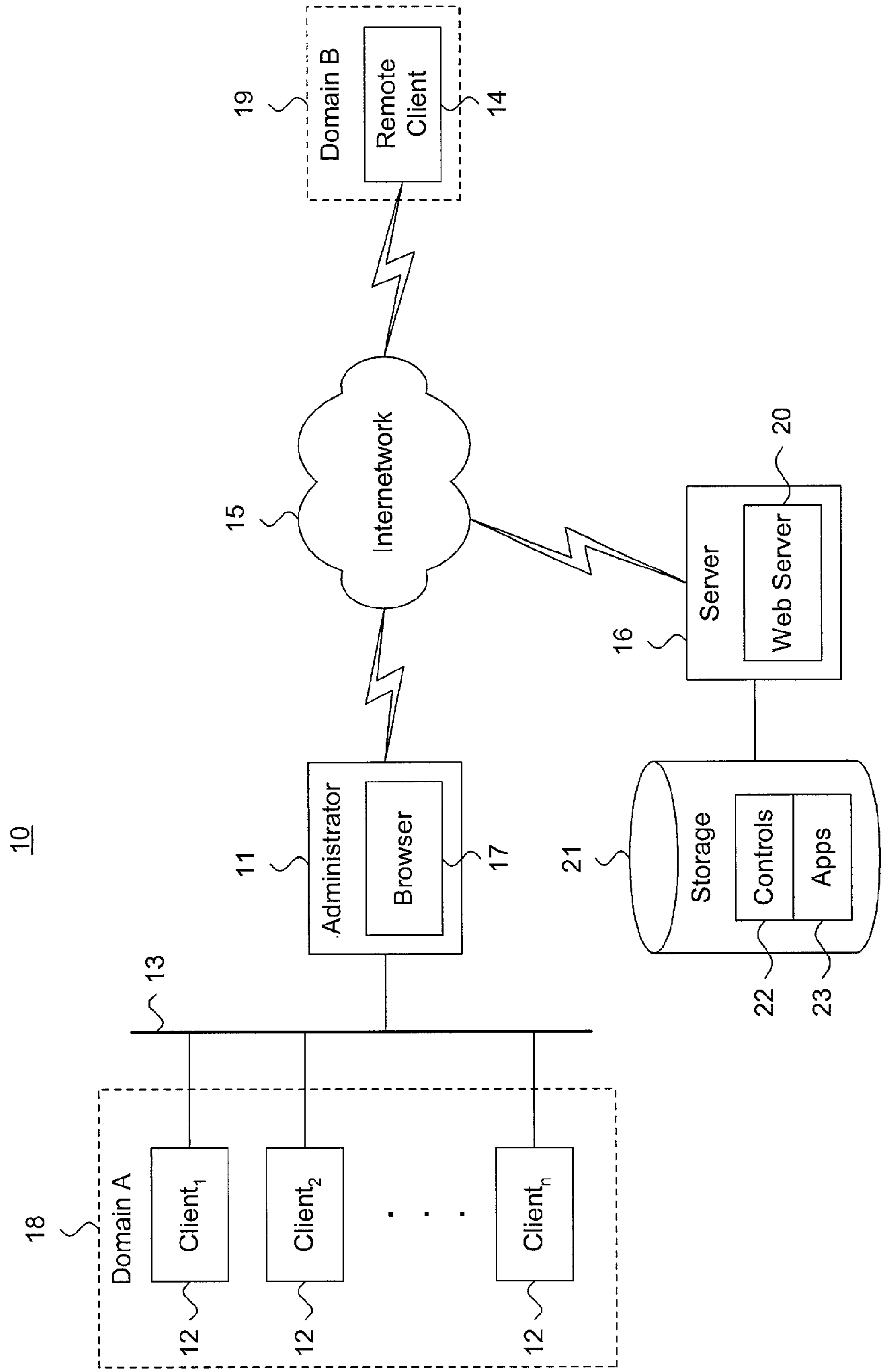
FIG. 1 is a network diagram showing a system for providing Web-based remote security application client administration in a distributed computing environment in accordance with the present invention.

FIG. 1 is a network diagram 10 showing a system for providing Web-based remote security application client administration in accordance with the present invention. An administrator system 11 is connected to a plurality of individual clients 12 over an intranetwork 13. The administrator system 11 also is connected to a remote client 14 over an internetwork 15, including the Internet.

A browser application 17 executes on the administrator system 11. Web pages are requested and retrieved from a server 16 interconnected to the administrator system 11 over the internetwork 15. The server 16 includes a storage device 21 in which a file system is maintained for the storage of files and information. The server 16 executes a Web server 20 which receives, processes replies to requests from the administrator system 11. Web content, in the form of Web pages, is sent to the administrator system 11 for interpretation and display on the browser application 17.

The administrator system 11 is responsible for the remote administration of applications and, in particular, security applications, fielded to the clients 12 and remote clients 14. For convenience, clients are administered by domain. By way of example and illustration, the clients 12 connected over the intranetwork 13 are grouped into a first domain 18, Domain A, and the remote client 14 is grouped into a second domain 19, Domain B. Client applications executing in each of the domains 18, 19 can be remotely administered by the administrator system 11. Remote administration includes the operations of installing, configuring, updating and patching applications and, in particular, security applications, such as virus scanning, virus screening, active security, firewall, and virtual personal networks (VPNs).

For each domain 18, 19, the administrator system 11 executes a credentialed administration Web page, as further described below beginning with reference to FIG. 3, in which individual clients 12 are selected for administration. The administration Web page includes dynamic content generated through embedded controls 22 incorporated within each Web page. The Web server 20 executes the controls 22 only when each control is expressly encountered upon a Web page request.

In addition to credentialing users, the administration Web page includes controls for copying applications (apps) 23 from the storage device 21 of the server 16 to the individual clients 12 transparently to the administration system 11. The applications 23 are stored as self-extracting configuration files, that is, self-extractable on a target client.

Through the use of Web-based administration, the clients 12 and remote clients 14 can be remotely administered using a centralized administration console with decentralized operation available on any system upon which a browser application can operate. As would be recognized by one skilled in the art, other network topologies and configurations, including various configurations using intranets, internetworks, direct connections, dial-up connections, or by a combination of the foregoing are possible.

The individual computer systems, including the administrator 11, clients 12, remote client 14, and server 16 are general purpose, programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. Program code, including software programs, and data are loaded into the RAM for execution and processing by the CPU and results are generated for display, output, transmittal, or storage.

Figure 2:
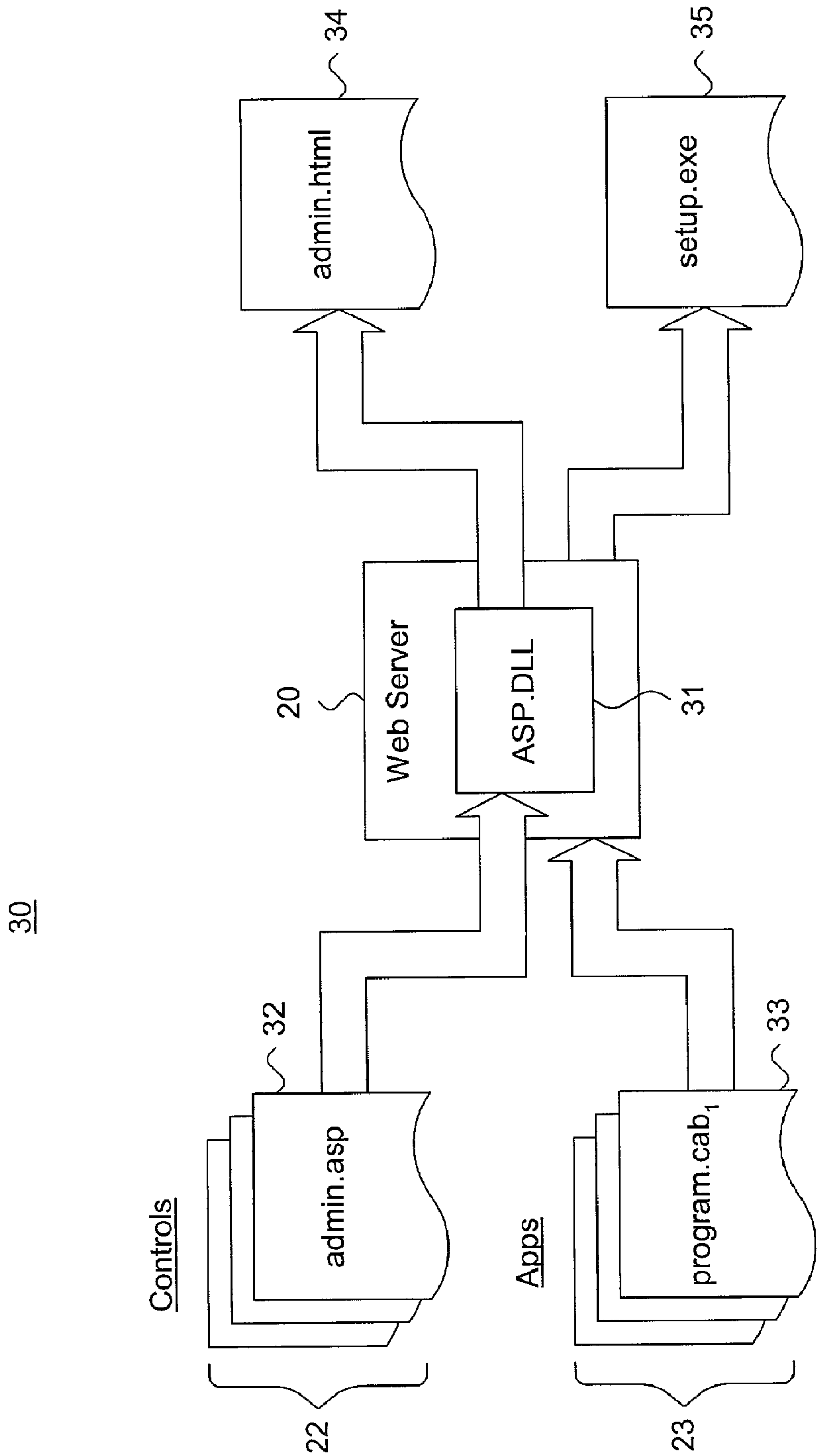
FIG. 2 is a block diagram showing the Web server of FIG. 1.

FIG. 2 is a block diagram showing the Web server 20 of FIG. 1. The Web server 20 serves Web pages, including static content and dynamic content. The Web pages exported to the administrator system 11 (shown in FIG. 1) are dynamic Web pages that include controls 22 for administering clients 12 by domain 18. In the described embodiment, Active Server Page (ASP) content is used to generate the dynamic Web pages. Whenever the administrator system 11 via the browser application 17 requests a Web page that encapsulates a control 22, a request for an embedded administrator control, admin.asp 32, is executed by the Web server 20. A scripting language interpreter, asp.dll 31, is loaded and used to execute any server-side code found in admin.asp 32. A platform independent Web page admin.html 34 is sent to the administrator system 11 for display on the browser application 17. Thus, the functionality of the administrator system 11 is system-independent and can be provided on any system having a browser application 17.

The control admin.asp 32 provides security to each domain 18, 19. Any attempt to administer applications on the individual clients 12, 14 requires a user to first credential with the Web server 20 before being allowed to copy applications 23 onto each of the individual clients 12, 14.

A library of applications 23 is maintained with the controls 22. In the described embodiment, each client application 23 is stored on a cabinet (.cab) file, a standardized convention for compressing and distributing a repository of files comprising an individual application. Thus, once credentialed, an individual client applications program.cab$_1$ through program.cab$_n$, is copied from the applications library 23 onto the target client as an executable installation file program.cab$_i$ 35. Once copied to the target client, the content of the file 35 is extracted and installed on the target client 12, 14, as further described below with reference to FIG. 9. Active server pages are described in A. K. Weissinger, "ASP in a Nutshell," Ch. 1–3, O'Reilly & Associates, Inc., Sebastopol, Calif. (1999), the disclosure of which is incorporated by reference.

Each control 22 is a computer program, procedure or module written as source code in a conventional programming language, such as the Java or Visual Basic programming languages, and is presented for execution by the CPU of the server 20 as object or byte code, as is known in the art. The various implementations of the source code and object and byte codes can be held on a computer-readable storage medium or embodied on a transmission medium in a carrier wave. The server 20 operates in accordance with a sequence of process steps, as further described below beginning with reference to FIG. 7.

Figure 3:
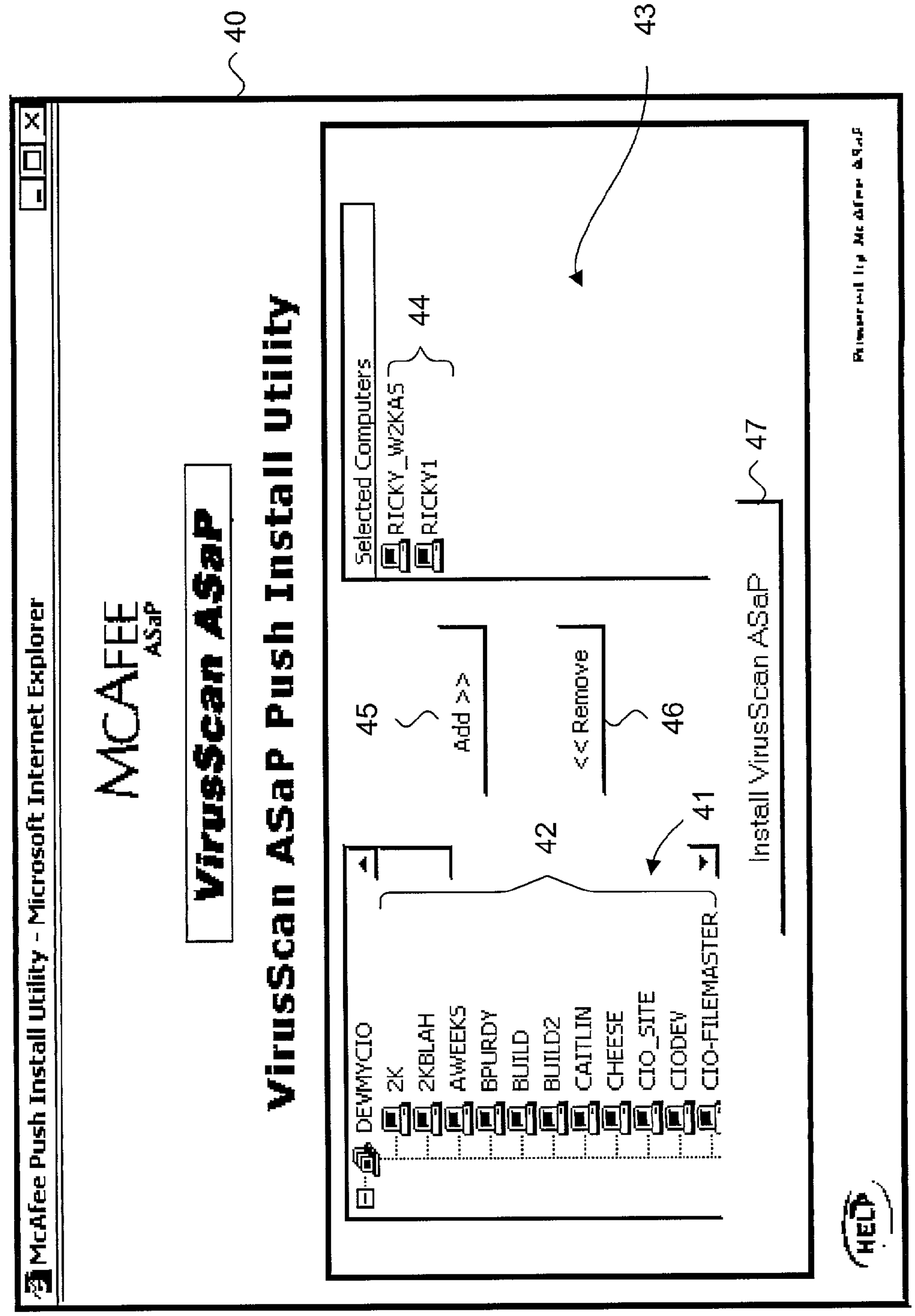
FIG. 3 is a screen shot showing a domain selection screen exported by the Web server of FIG. 1.

FIG. 3 is a screen shot 40 showing a domain selection screen exported by the Web server 20 of FIG. 1. The clients 12 (shown in FIG. 1) are administered by domain 18. A hierarchical tree 41 of individual clients 42 is displayed. Selected clients 44 are displayed in a list 43. Individual clients 42 are added to the list 43, using an Add button 45 and removed using a Remove button 46. Individual clients are interactively selected and removed from the list 43 and, upon completion, an executable installation file 35 (shown in FIG. 2) is copied by triggering the install button, Install Virus Scan ASAP, 47.

Figure 4:
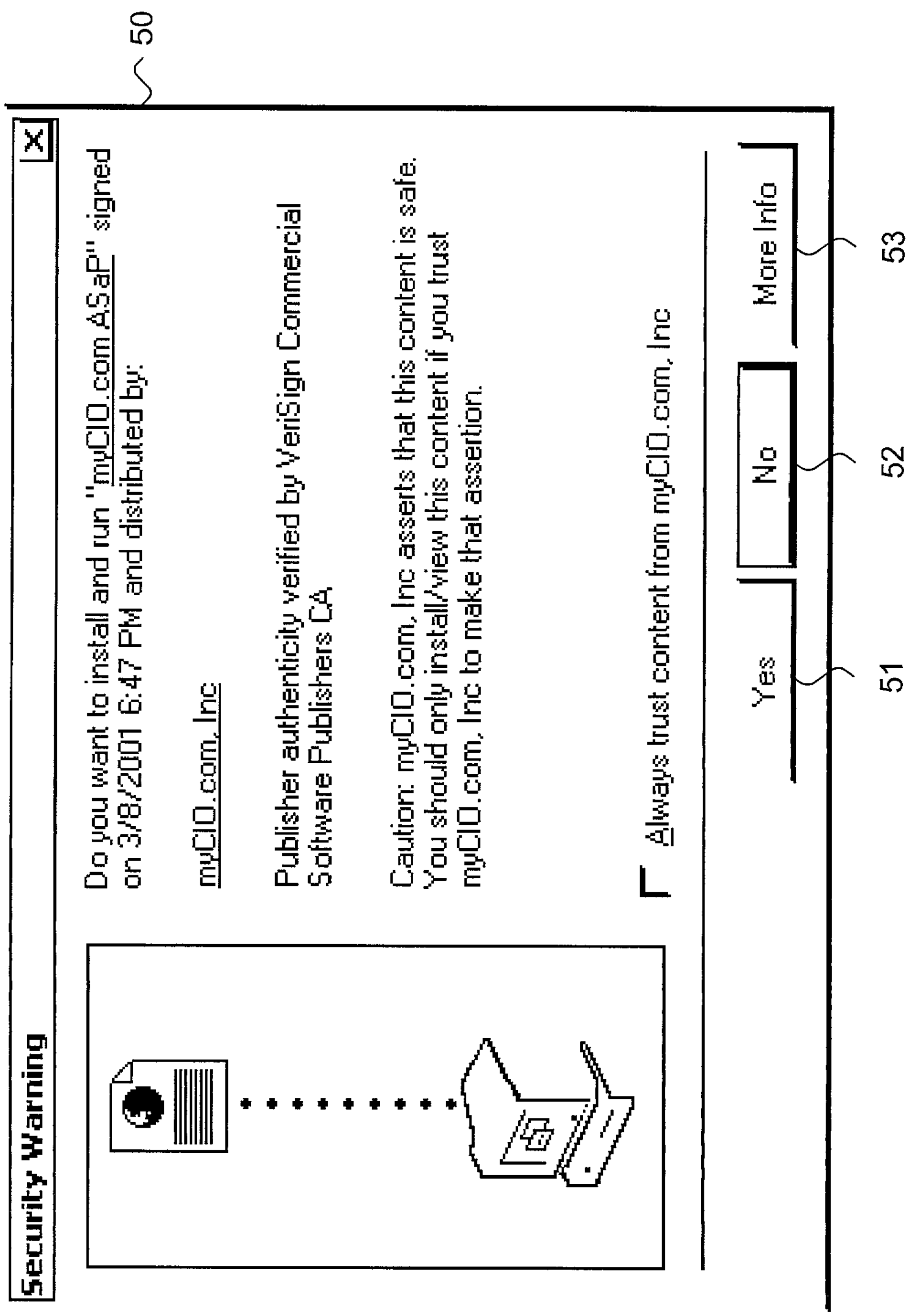
FIG. 4 is a screen shot showing an installation confirmation panel exported by the Web server of FIG. 1.

FIG. 4 is a screen shot showing an installation confirmation panel 50 exported by the Web server 20 of FIG. 1. This panel is generated upon the triggering of the Install button 47 (shown in FIG. 3) and presents the administrator with an opportunity to confirm (Yes button 51), cancel (No button 52), or defer (More Info button 53) installation and administration.

In the described embodiment, the executable configuration file 33 is remotely copied to the individual clients 12 and remote clients 14 using digital signature technology, thereby adding an additional layer of security to the remote administration process.

Figure 5:
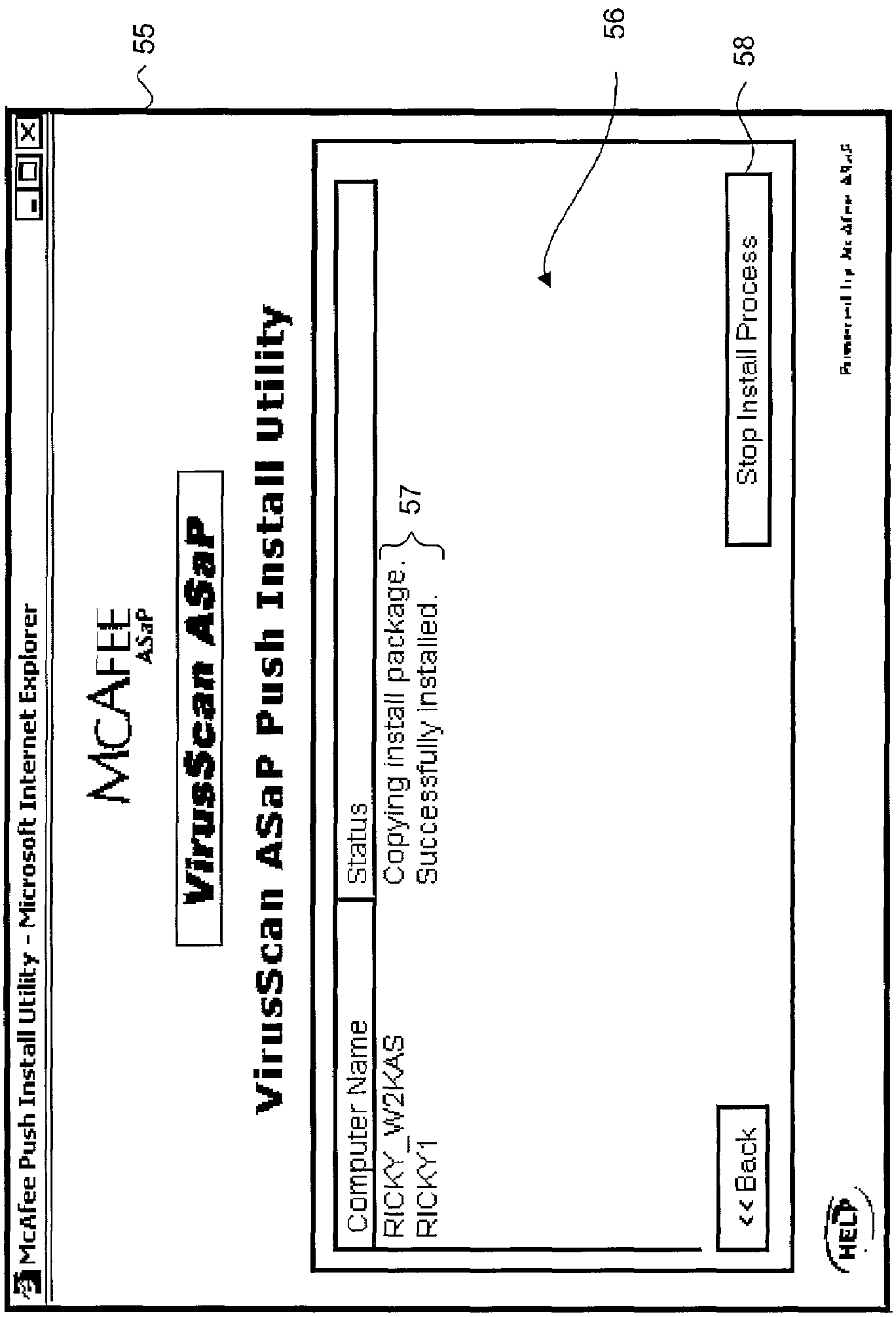
FIG. 5 is a screen shot showing a status screen exported by the Web server of FIG. 1.

FIG. 5 is a screen shot showing a status screen 55 exported by the Web server 20 of FIG. 1. This screen is generated after the confirmation of an installation to enable an administrator to monitor the progress of installations. A status panel 56 displays a list 57 of remote installations underway. The installation process can optionally be stopped (Stop Install Process button 58).

Figure 6:
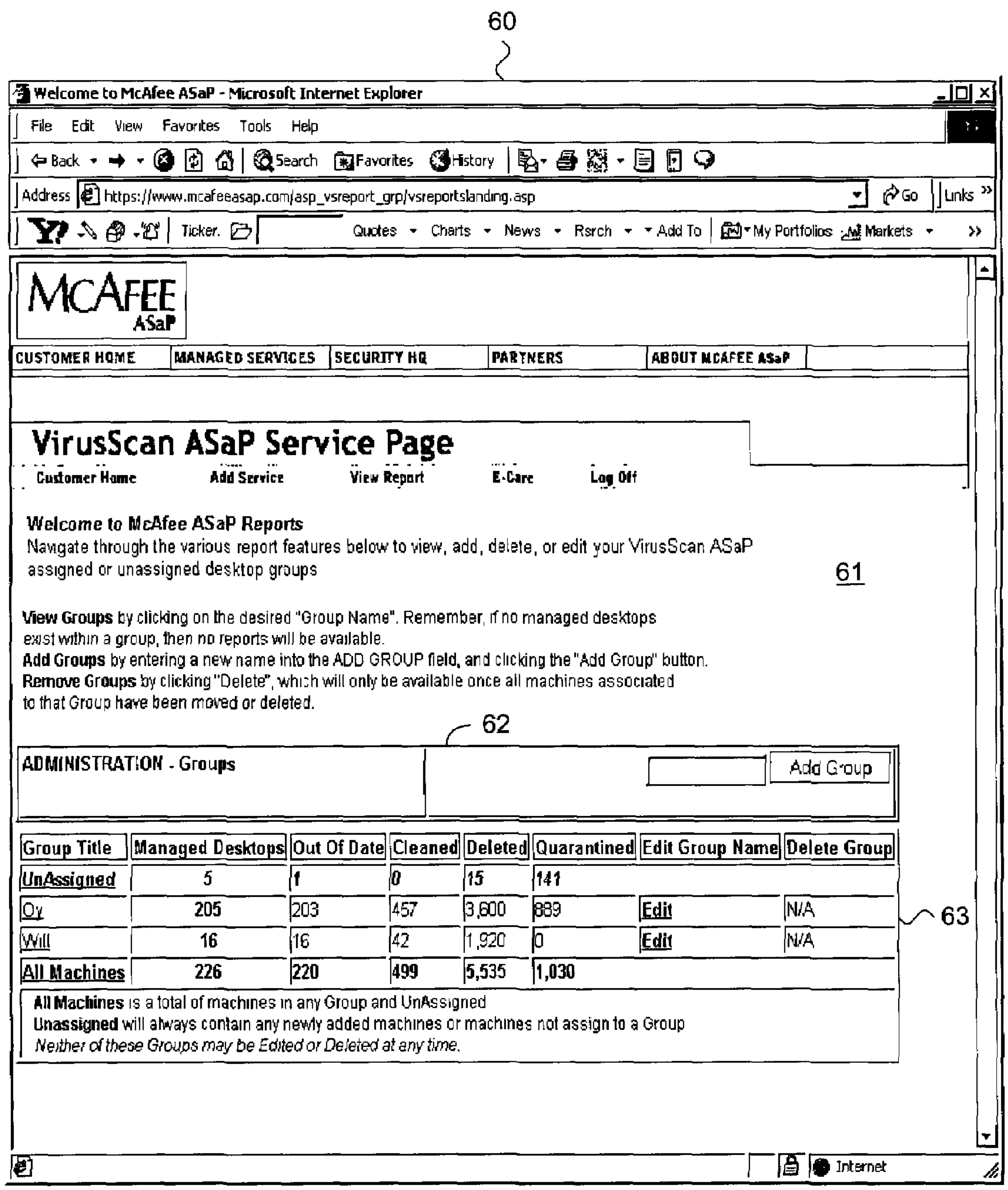
FIG. 6 is a screen shot showing a report screen exported by the Web server of FIG. 1.

FIG. 6 is a screen shot 60 showing a report screen 61 exported by the Web server 20 of FIG. 1. This screen is generated as an adjunct to the remote client application installation and administration process. Administrative groups 62 of domains 18, 19 and clients 12 and remote clients 14 are displayed in a table 63, thereby allowing an administrator to determine the currency of applications, and in particular, security applications, currently fielded.

Figure 7:
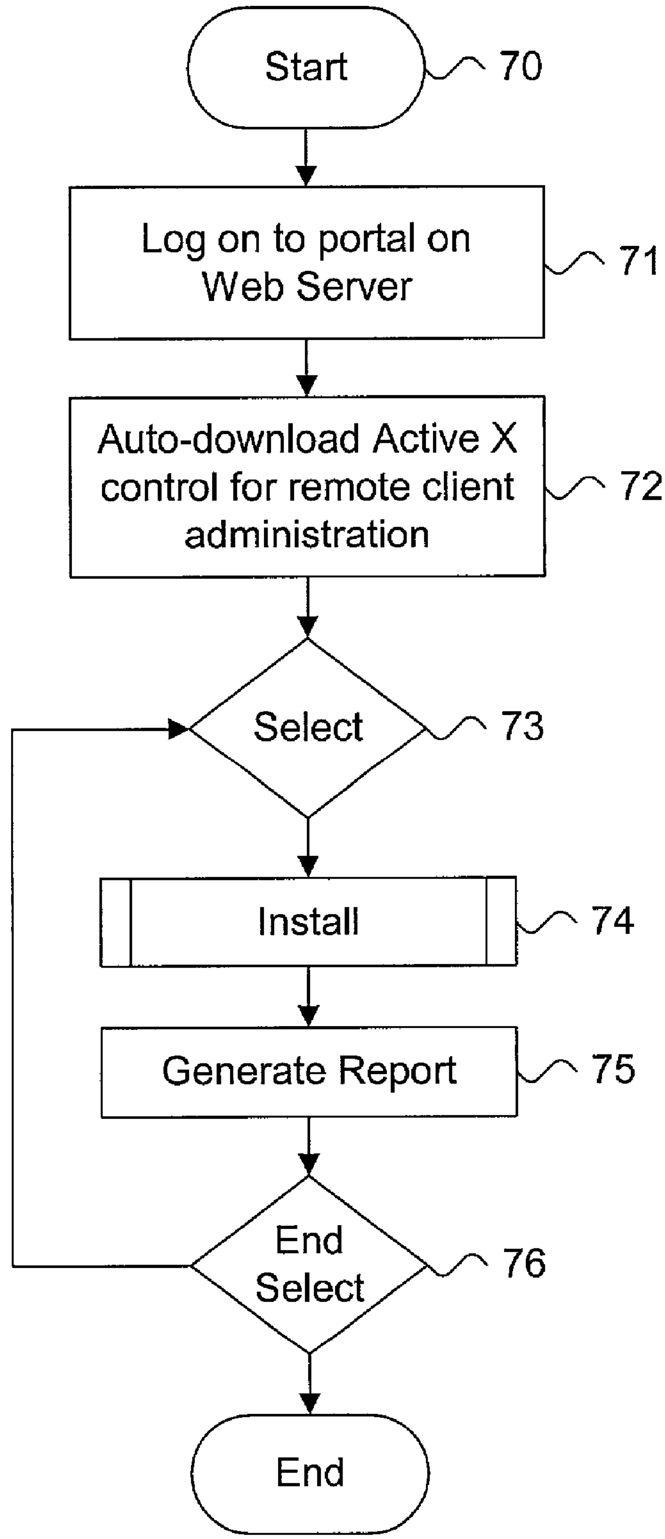
FIG. 7 is a flow diagram showing a method for providing Web-based remote security application client administration in a distributed computing environment in accordance with the present invention.

FIG. 7 is a flow diagram showing a method for providing Web-based remote security application client administration 70 in accordance with the present invention. The method proceeds in two phases. During initialization, an administrator logs onto an administration portal on the Web server 20 (shown in FIG. 1) (block 71). The "portal" is the logical environment generated by the Web pages exported by the Web server 20. Credentialing requires a user name and password. The Web pages used to provide administration are compliant with the Secure Hypertext Transfer Protocol (HTTPS).

Once credentialed, the administrator control 32 (shown in FIG. 2) is automatically downloaded for providing remote client administration (block 72). In the described embodiment, the configuration control 32 is implemented as an Active X control, although other forms of generating dynamic and interactive Web pages could be used, as would be recognized by one skilled in the art.

During operation, the administrator can interactively select (blocks 73–76) client application installation (block 74), as further described below with reference to FIG. 8, and report generation (block 75). Status reports are generated as an adjunct to the remote client administration, as described above with reference to FIG. 6. Upon the processing of the last administrator selection (blocks 73–76), the method terminates.

The portal consists of a series of Web pages and panels that are dynamically generated by the Web server 20 responsive to administrator requests sent by the browser application 17. Active controls 22 are executed by the Web server 20, using the languaging script interpreter 31, and executable configuration files 35 (shown in FIG. 2) are downloaded to one or more target clients by domain. By using a Web-based portal, an administrator can centrally control and administer clients while having decentralized operation available on any credentialable system with an available browser application. In the described embodiment, the Internet Explorer v.4.0, licensed by Microsoft Corporation, Redmond, Wash., is used, although any suitable browser could also be used.

Figure 8:
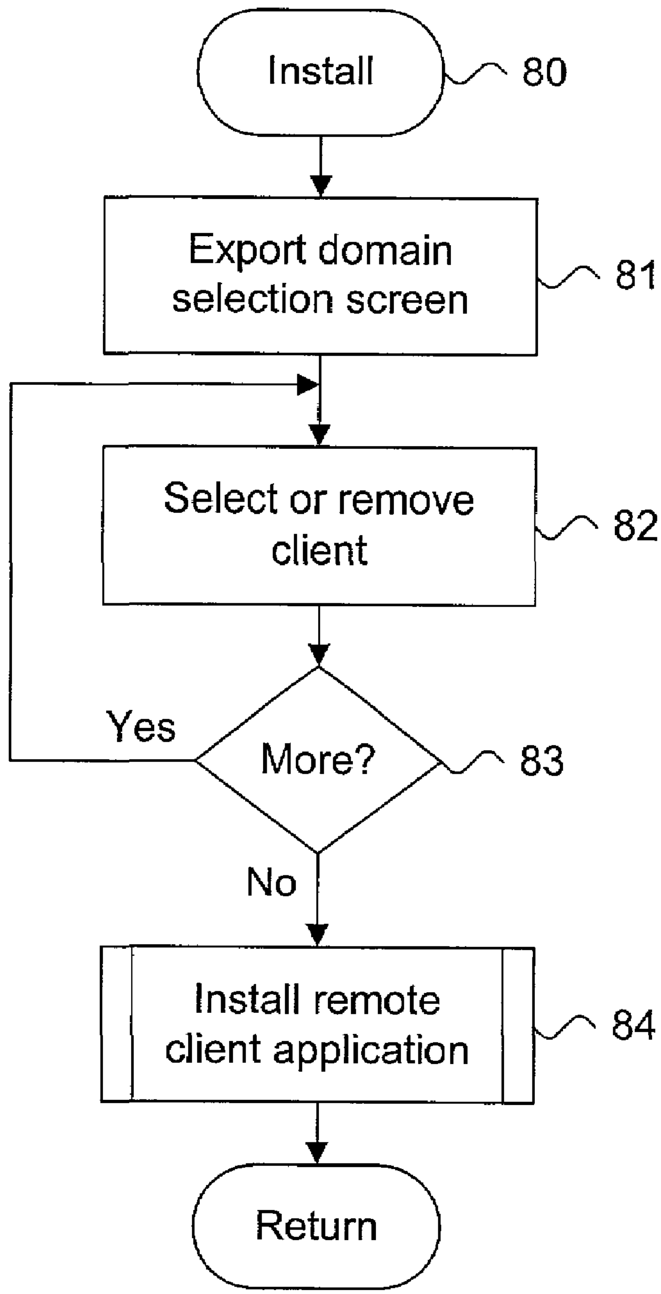
FIG. 8 is a flow diagram showing the routine for performing an install for use in the method of FIG. 7.

FIG. 8 is a flow diagram showing the routine for performing an install 80 for use in the method 70 of FIG. 7. The purpose of this routine is to allow an administrator to select one or more clients within a domain for administration.

First, a domain selection screen is exported, such as shown, by way of example, in the screen shot 40 discussed above with reference to FIG. 3, by the Web server 20 (block 81). The administrator selects or removes individual clients (block 82) until satisfied with the selection (block 83). The individual client applications are then remotely installed (block 84), as further described below with reference to FIG. 9. The routine then returns.

Figure 9:
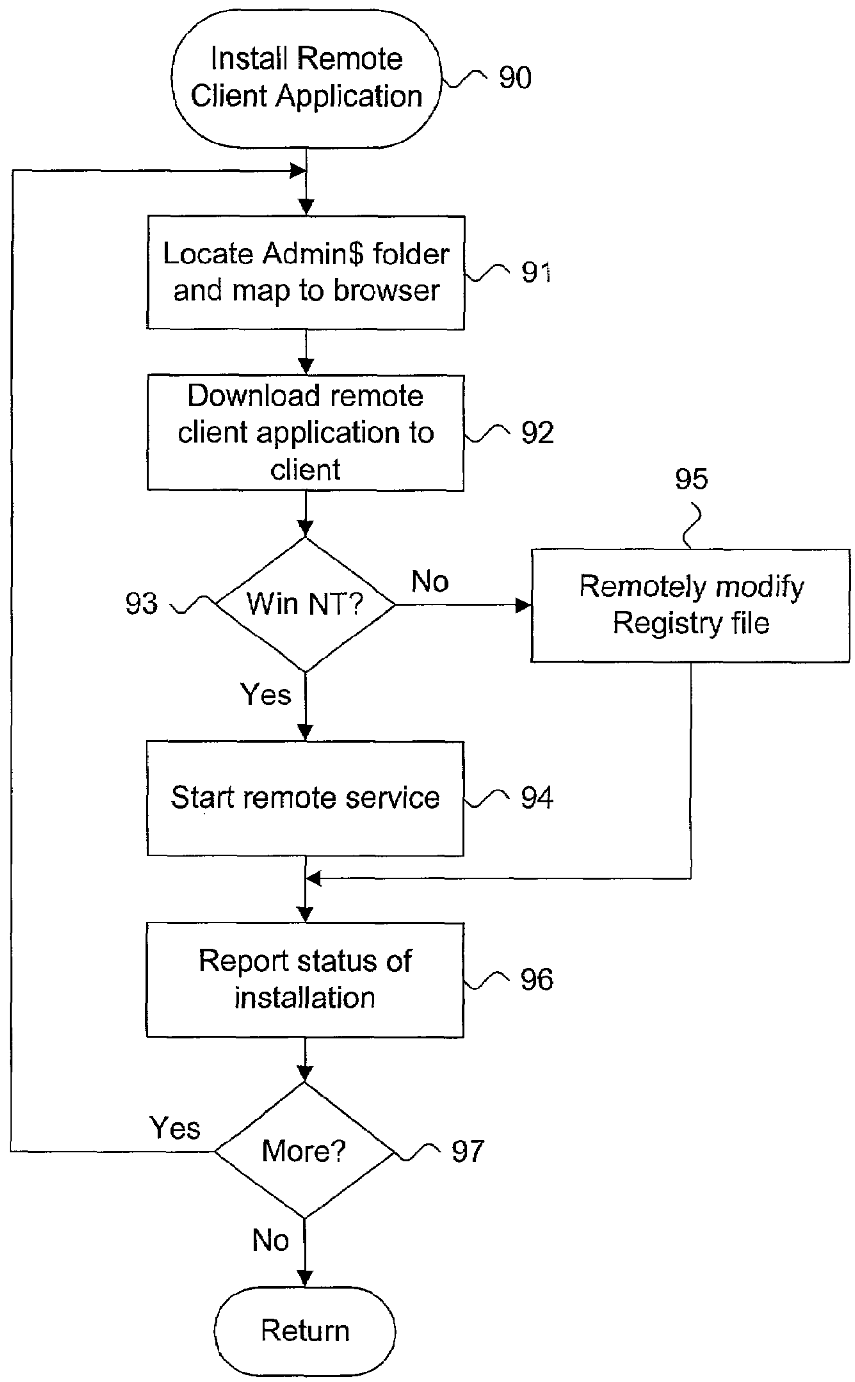
FIG. 9 is a flow diagram showing the routine for installing a remote client application for use in the routine of FIG. 8.

FIG. 9 is a flow diagram showing the routine for installing a remote client application 90 for use in the routine 80 of FIG. 8. The purpose of this routine is to concurrently install client applications, and in particular, security applications, on individual clients through apush approach.

In the described embodiment, the Windows NT (v.4, Service Pack 3 or higher), and Windows 9X (Windows 95, Windows 98, Windows ME, Windows 2000) operating environments are supported, although other similar operating environments could also be administered, as would be recognized by one skilled in the art. The conventions described herein are based on the aforementioned operating environments, but can be generalized to other forms of file directories and installation methodologies.

For all installations, the administrator must have remote administration privileges for each of the target clients. The administration folder admin$ is located and mapped to the browser application 17 (shown in FIG. 1) (block 91). The remote client application, in the form of an executable configuration file 35 (shown in FIG. 2), is copied to the admin$ folder on the target client (block 92). In the described embodiment, the executable configuration file results in the creation of a setup file via VSScanSetup.exe. If the target operating environment is a Windows NT-compliant (block 93), the executable configuration file 35 is installed as a remote service and the remote service is started (block 94). Otherwise, the executable configuration file 35 is installed as a start-up application by modifying the registry file. For a Windows 9X environment, the registry file would be modified to contain the following string:

LocalMachine/Software/Microsoft/Windows/CurrentVersion/Run_Once/VSScanSetup.exe

Upon the next reboot of the target system, the executable configuration file 35 will be executed and the client application installed.

The status of the installation is then reported, such as by way of the status screen 55 described above with reference to FIG. 5 (block 96). If more client installations remain (block 97), the remote client application installation process (block 91–96) is repeated, after which the routine returns. Note the installation steps naturally allow installation to occur concurrently and independently on each of the target clients.

While the invention has been particularly shown and described as referenced to the embodiments thereof, those skilled in the art will understand that the foregoing and other changes in form and detail may be made therein without departing from the spirit and scope of the invention.

What is claimed is:

1. A system for providing Web-based remote security application client administration in a distributed computing environment, comprising:

a self-extracting configuration file containing an executable configuration file that is self-extractable on a target client into a security application that is remotely administered by an administrator system;

an executable control embedded within an active administration Web page, the executable control being triggered upon each request for the active Web page by the administrator and causing dynamic Web content to be generated therefrom;

a Web server exporting a Web portal comprising the active administration Web page to a browser application on the administrator system independent of a specific operating environment and interpreting the executable control to facilitate copying of the self-extracting configuration file to the target client.

2. A system according to claim 1, further composing:

the Web server facilitating copying of the self-extracting configuration file concurrently to a plurality of target clients.

3. A system according to claim 1, further comprising:

the Web server checking administrator credentials while exporting file Web portal against a list of authorized administrators.

4. A system according to claim 1, further comprising:

the Web server monitoring the status of the copying of self-extracting configuration file to at least one target client.

5. A system according to claim 1, further comprising:

the Web server reporting the status of security application configuration on at least one target client.

6. A system according to claim 1, further comprising:

the self-extracting configuration file performing at least one of an installation, configuration, updating, and patching of the security application by executing the executable configuration file.

7. A system according to claim 1, wherein the executable configuration file comprises at least one of a virus scanning, virus screening, active security, firewall, and VPN performance reporting application.

8. A system according to claim 1, wherein the executable configuration file is a cabinet archival file.

9. A system according to claim 1, wherein the active control is an Active X-compliant control.

10. A system according to claim 1, wherein the distributed computing environment is TCP/IP-compliant.

11. A method for providing Web-based remote security application client administration in a distributed computing environment, comprising:

storing a self-extracting configuration file containing an executable configuration file that is self-extractable on a target client into a security application that is remotely administered by an administrator system;

providing an executable control embedded within an active administration Web page, the executable control being triggered upon each request for the active Web page by the administrator system and causing dynamic Web content to be generated therefrom;

exporting a Web portal comprising the active administration Web page to a browser application on the administrator system independent of a specific operating environment; and interpreting the executable control to facilitate copying of the self-extracting configuration file to the target client.

12. A method according to claim 11, further comprising:

facilitating copying of the self-extracting configuration file concurrently to a plurality of target clients.

13. A method according to claim 11, further comprising:

checking administrator credentials while exporting the Web portal against a list of authorized administrators.

14. A method according to claim 11, further comprising:

monitoring the status of the copying of the self-extracting configuration file to at least one target client.

15. A method according to claim 11, further comprising:

reporting the status of security application configuration on at least one target client.

16. A method according to claim 11, further comprising:

performing at least one of an installation, configuration, updating, and patching of the security application by executing the executable configuration file.

17. A method according to claim 11, wherein the executable configuration file comprises at least one of a virus scanning, virus screening, active security, firewall, and VPN performance reporting application.

18. A method according to claim 11, wherein the executable configuration file is a cabinet archival file.

19. A method according to claim 11, wherein the active control is an Active X-compliant control.

20. A method according to claim 11, wherein the distributed computing environment is TCP/IP-compliant.

21. A computer-readable storage medium holding code for performing the method according to claim 11.

22. A system for remotely administering a client application using a Web-based portal in a TCP/IP-compliant environment, comprising:

an archival configuration file capable of self-extracting on a target client into an executable configuration file;

an executable control embedded into an active administration Web page, the executable control being triggered upon each request for the active Web page by a requesting administrator and causing dynamic Web content to be generated therefrom;

a Web server serving the active administration Web page to a browser application to the requesting administrator, comprising:

a security module confirming credentials for the requesting administrator against a list of authorized administrators; and a transfer module interpreting the executable control upon successful credentialing to facilitate substantially concurrent copying of the self-extracting configuration file to at least one target client.

23. A system according to claim 22, further comprising:

the Web server continuously monitoring the status of the copying of the self-extracting configuration file to the at least one target client; and the Web server generating a status event upon completion of the copying.

24. A system according to claim 22, further comprising:

the Web server reporting the status of each application configuration on the at least one target client.

25. A system according to claim 22, wherein the active control is an Active X-compliant control.

26. A method for remotely administering a client application using a Web-based portal in a TCP/IP-compliant environment, comprising:

storing an archival configuration file capable of self-extracting on a target client into an executable configuration file;

embedding an executable control into an active administration Web page, the executable control being triggered upon each request for the active Web page by a requesting administrator and causing dynamic Web content to be generated therefrom;

serving the active administration Web page to a browser application to the requesting administrator, comprising:

confirming credentials for the requesting administrator against a list of authorized administrators; and interpreting the executable control upon successful credentialing to facilitate substantially concurrent copying of the self-extracting configuration file to at least one target client.

27. A method according to claim 26, further comprising:

continuously monitoring the status of the copying of the self-extracting configuration file to the at least one target client; and generating a status event upon completion of the copying.

28. A method according to claim 26, further comprising:

reporting the status of each application configuration on the at least one target client.

29. A method according to claim 26, wherein the active control is an Active X-compliant control.

30. A computer-readable storage medium holding code for performing the method according to claim 26.

* * * * *

UNITED STATES PATENT AND TRADEMARK OFFICE

CERTIFICATE OF CORRECTION

PATENT NO. : 6,947,986 B1
APPLICATION NO. : 09/851648
DATED : September 20, 2005
INVENTOR(S) : Huang et al.

It is certified that error appears in the above-identified patent and that said Letters Patent is hereby corrected as shown below:

col. 7, line 16 insert --system-- before "and" and after "administrator";
col. 7, line 24 replace "composing" with --comprising--;
col. 7, line 30 insert --the-- before "file" and after "exporting";
col. 7, line 33 insert --the-- before "self-extracting" and after "of".

Signed and Sealed this

Sixteenth Day of February, 2010

David J. Kappos

David J. Kappos
*Director of the United States Patent and Trademark Office*